United States Patent Office 3,092,620
Patented June 4, 1963

3,092,620
DERIVATIVES OF PENICILLANIC ACID
Thomas A. Seto, Groton, Conn., assignor to Chas. Pfizer & Co., Inc., New York, N.Y., a corporation of Delaware
No Drawing. Filed Oct. 5, 1960, Ser. No. 60,545
5 Claims. (Cl. 260—239.1)

This invention relates to new antibiotic compounds and their salts and, more particularly, to novel 6-aminopenicillanic acid derivatives and their salts which exhibit antagonism to the antibiotic resistant Staphylococci and which are resistant to penicillinase.

The term "penicillin" includes a number of acyl derivatives of 6-aminopenicillanic acid which differ only in the nature of the R' group and possess the general formula:

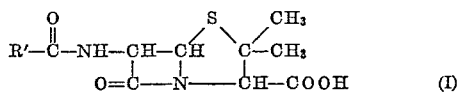
(I)

in which the acyl moiety is derived from a hydrocarbon carboxylic acid. Also known, but of little practical therapeutic value, are a few acyl derivatives of 6-aminopenicillanic acid wherein the acyl moiety is an organo sulfonic acid moiety, such as benzenesulfonyl- or p-toluenesulfonyl-. In such instances, of course, the carbonyl group of Formula I is replaced by a sulfonyl (—SO₂—) group.

The properties of a particular penicillin are determined by the R' group. The best known and most widely used penicillins are benzylpenicillin and phenoxymethylpenicillin wherein R' (Formula I) represents the benzyl- and phenoxymethyl-radicals. Both compounds are effective via both parenteral and oral administration in the treatment of bacterial infections due to gram-positive organisms but are far less effective against gram-negative organisms many of which are resistant to their action. These, and other presently available penicillins, however, are ineffective against penicillinase producing strains of bacteria, such as *Escherichia coli, Bacillus subtilis, Bacillus cereus* and various Staphylococci strains. The penicillinases produced by these bacteria antagonize the antibacterial activity of the penicillin compound by hydrolysis of the beta lactam linkage to produce the biologically and antigenically inactive penicilloic acid.

There has now been discovered a series of novel and valuable derivatives of 6-aminopenicillanic acid which, in addition to their antagonism toward gram-positive microorganisms, are surprisingly resistant to the effect of penicillinase and, therefore, of value in the treatment of bacterial infections due to penicillinase producing organisms resistant to the presently available penicillins. The novel compounds of this invention present a complete structural departure from the heretofore known penicillin antibiotics in having a direct nitrogen to phosphorus linkage in place of the carbonyl group of the presently available penicillins.

They have, in the acid form, the formula:

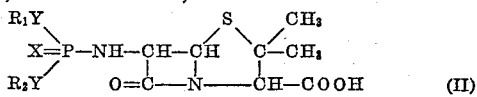
(II)

wherein $R_1$ and $R_2$ are the same or different and are selected from the group consisting of alkyl containing 1 to 7 carbon atoms which may be straight or branched chain, substituted alkyl wherein the substituent is selected from the group consisting of nitro, lower alkoxy, lower alkylmercapto, phenyl, phenoxy, phenylmercapto, chloro, bromo and fluoro; cyclohexyl, cyclopentyl, benzyl, α-methylbenzyl, allyl, phenyl and substituted phenyl wherein the substituent is selected from the group consisting of chloro, bromo, lower alkyl, lower alkoxy and nitro; substituted benzyl wherein the substituent is selected from the group consisting of chloro, bromo, lower alkyl, lower alkoxy and nitro; and when taken together $R_1$ and $R_2$ are phenyl; X and Y may be the same or different and are selected from the group consisting of oxygen and sulfur. By lower alkyl and lower alkoxy is meant alkyl and alkoxy groups containing 1 to 4 carbon atoms.

The new antibiotics can be named by reference to the 6-aminopenicillanic acid moiety or the amidophosphoric acid or amidothionophosphoric acid moiety as the parent compound. Thus, for example, when considered as derivatives of 6-aminopenicillanic acid, the compound wherein X is sulfur, Y is oxygen and $R_1$ and $R_2$ are ethyl, is named 6-[O,O-diethylthionophosphoryl)amido]penicillanic acid. The same compound, when considered as an amidothionophosphoric acid, is named N-(6-penicillanyl)-amidothionophosphoric acid diethyl ester. It is preferred to name them as derivatives of penicillanic acid since this system of nomenclature points, at one and the same time, to their structural similarity and dissimilarity to the penicillins of Formula I.

Included in the present invention are the non-toxic salts of these novel penicillins, that is, non-toxic metal salts such as the sodium, potassium, calcium and magnesium salts, and non-toxic ammonium and substituted ammonium salts, for example, salts of such non-toxic amines as procaine, dibenzylamine, N,N' - dibenzylethylenediamine, 1-ephenamine, N-benzyl-β-phenethylamine, dehydroabietylamine and other amines which have been used to form salts with benzylpenicillin.

In addition to their resistance or inertness to penicillinase, the valuable products of this invention also demonstrate antagonism toward gram-positive and gram-negative organisms although the activity towards both classes is generally somewhat lower than that of benzylpenicillin.

The therapeutic value of these compounds is apparent on comparison of their in vitro activity against various antibiotic resistant *S. aureus* cultures with that of benzylpenicillin. The minimum inhibitory concentrations of several of the novel products of this invention and of benzylpenicillin (potassium salts) are reported in Table I in terms of mcg./ml.

*Table I*
ACTIVITY AGAINST RESISTANT *S. AUREUS*

| X | Y | R₁ | R₂ | 5 | 376 | 400 | K₃ | K₄ | M1 | M2 | M12 | M13 |
|---|---|---|---|---|---|---|---|---|---|---|---|---|
| S | O | CH₃OCH₂CH₂ | CH₃OCH₂CH₂ | 12.5 | 25 | 25 | 12.5 | 12.5 | 12.5 | 12.5 | 12.5 | 12.5 |
| S | O | ClCH₂CH₂ | ClCH₂CH₂ | 0.78 | 12.5 | 3.12 | 1.56 | 1.56 | 1.56 | 1.56 | 1.56 | 1.56 |
| S | O | C₆H₅ | C₆H₅ | 0.39 | 1.56 | 0.78 | 0.39 | 0.39 | 0.78 | 0.39 | 0.39 | 0.39 |
| O | O | C₂H₅ | C₂H₅ | 6.25 | 12.5 | 12.5 | 6.25 | 6.25 | 12.5 | 6.25 | 12.5 | 6.25 |
| O | O | CH₃ | CH₃ | 6.25 | 12.5 | 12.5 | 12.5 | 12.5 | 12.5 | 12.5 | 12.5 | 12.5 |
| O | O | n-C₄H₉ | n-C₄H₉ | 3.12 | 3.12 | 6.25 | 1.56 | 3.12 | 3.12 | 6.25 | 3.12 | 3.12 |
| S | O | C₂H₅ | C₂H₅ | 6.25 | 6.25 | 6.25 | 6.25 | 6.25 | 12.5 | 6.25 | 6.25 | 6.25 |
| S | O | n-C₄H₉ | n-C₄H₉ | 1.56 | 3.12 | 6.25 | 1.56 | 1.56 | 3.12 | 1.56 | 1.56 | 3.12 |
| O | O | p-(CH₃O)C₆H₄ | p-(CH₃O)C₆H₄ | 1.56 | 1.56 | 1.56 | 1.56 | 1.56 | 1.56 | 1.56 | 1.56 | 1.56 |
| S | O | m-(CH₃)C₆H₄ | m-(CH₃)C₆H₄ | 1.56 | 3.12 | 3.12 | 1.56 | 3.12 | 3.12 | 3.12 | 6.25 | 3.12 |
| S | O | o-ClC₆H₄ | o-ClC₆H₄ | 3.12 | 12.5 | 12.5 | 12.5 | 12.5 | 12.5 | 12.5 | 12.5 | 12.5 |
| O | O | o-ClC₆H₄ | o-ClC₆H₄ | 0.09 | 0.78 | 0.78 | 0.78 | 0.19 | 0.78 | 0.78 | 0.78 | 0.78 |
| S | O | n-C₃H₇ | n-C₃H₇ | 6.25 | 6.25 | 6.25 | 3.12 | 3.12 | 6.25 | 12.5 | 6.25 | 12.5 |
| Benzylpenicillin | | | | 0.03 | 100 | 100 | 50 | 100 | 50 | 100 | 100 | 100 |

Comparison of the in vivo activity of these novel products with that of phenoxymethylpenicillin against the penicillin resistant *S. aureus* 400 infection in mice further illustrates their remarkable and unexpected therapeutic value. The $PD_{50}$ values (50% curative or survival dose) for several [phosphoryl amido]penicillanic acids and phenoxymethylpenicillin, as their potassium salts, are given in Table II in terms of mg./kg.

Table II $PD_{50}$ VALUES OF [PHOSPHORYLAMIDO] PENICILLANIC ACIDS AND OF PHENOXYMETHYLPENCILLIN VS. *S. AUREUS* 400

| $R_1$ | $R_2$ | X | Y | Oral | Parenteral |
|---|---|---|---|---|---|
| $C_2H_5$ | $C_2H_5$ | O | O | 46 | 40 |
| $C_2H_5$ | $C_2H_5$ | S | O | 140 | 100 |
| m-Tolyl | m-Tolyl | O | O | 200 | 150 |
| $CH_3$ | $C_6H_5$ | O | O | 200 | 50 |
| $C_2H_5$ | $C_6H_5$ | O | O | 360 | 100 |
| $C_6H_5CH_2$ | $C_6H_5CH_2$ | O | S | >200 | 180 |
| $C_2H_5$ | $C_4H_9$ | O | O | -------- | 38 |
| n-$C_4H_9$ | $C_6H_5$ | O | O | 125 | 50 |
| $ClCH_2CH_2$ | $ClCH_2CH_2$ | O | O | <100 | <50 |
| Phenoxymethylpenicillin | | | | >800 | >800 |

Many of these products are surprisingly resistant to the action of penicillinase. Indeed, compounds such as 6-[(O,O-diethylthiophosphoryl)amido]penicillanic acid, 6 - [(O,O,-dimethylthionophosphoryl)amido]penicillanic acid, 6 - [(O,O-di-n-butylphosphoryl)amido]penicillanic acid, and 6 - [(O,O - bis-2-chloroethylphosphoryl)amido]penicillanic acid appear to be completely resistant to degradation by penicillinase. The remaining compounds exhibit greater penicillinase resistance than does benzylpenicillin.

The valuable products of this invention are, therefore, remarkably effective in treating a number of gram-positive, gram-negative and penicillin resistant infections in animals including man. For this purpose, the pure materials or mixtures thereof with other antibiotics can be employed. They may be administered alone or in combination with a pharmaceutical carrier selected on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents or be injected parenterally, that is, for example, intramuscularly or subcutaneously. For parenteral administration they are best used in the form of a sterile aqueous solution which may contain other solutes, for example, enough saline or glucose to make the solution isotonic. The particular regimen and dosage adopted will be assessed by the physician according to the age, weight and condition of the patient. In general, however, the dosage will be approximately the same order of magnitude as is used in the case of phenoxymethylpenicillin treatment of gram-positive infections.

The new and valuable compounds of the present invention are prepared by the reaction, in a reaction-inert solvent, of 6-aminopenicillanic acid with (1) the halogen (chloro or bromo) derivative of the appropriately substituted phosphate compound

wherein $R_1$, $R_2$, Y and X are as previously defined, in the presence of an acid acceptor at a pH value of from about 3 to about 9 and at a temperature of from about 0° C. to about 50° C.; (2) or with the appropriate phosphoric acid di-ester or secondary phosphoric e.g. $R_1R_2P(X)CH$, in the presence of a condensing agent, such as 1,3-dicyclohexylcarbodiimide, at a pH of from about 6 to about 9.

They can also be prepared by the method of Sheehan et al., Journal of the American Chemical Society 81, 3089 (1959), which utilizes D-penicillamine and t-butyl phthalimidomalonaldehydrate as starting materials for a series of reactions. Substitution of the phenoxyacetyl chloride utilized by Sheehan et al. by the appropriate halophosphate, for example, O,O-diethylchlorothionophosphate in the reaction sequence produces 6-[(O,O-diethylthionophosphoryl)amido]penicillanic acid potassium salt.

The necessary starting halophosphates are available via the reaction of the desired alcohol or phenol or mercapto analogs thereof with phosphoryl chloride or thionophosphoryl chloride in the manner described by Kosolapoff, "Organo Phosphorous Compounds," J. Wiley and Sons, Inc., N.Y. (1950), chapter 9.

It is preferred to utilize the reaction of 6-aminopenicillanic acid with the appropriately substituted halophosphate in the presence of an acid acceptor at a moderately acid to moderately alkaline pH level, that is, at pH values of from about 6.0 to about 9.0 in aqueous acetone since this process produces substantial yields of the desired product.

The 6-aminopenicillanic acid can be used in the form of the pure material dissolved or suspended in the solvent of choice, e.g., water, aqueous acetone, or in the form of a fermentation liquor or concentrate thereof prepared, for example, as described by Huang et al. in the J. Am. Chem. Soc. 82, 3790 (1960).

When prepared in this manner the novel antibiotics are obtained as the sodium or potassium salts. They are readily converted to the acid form by neutralization of their aqueous solutions with a mineral acid, such as sulfuric or hydrochloric acids, or a suitable ion exchange resin and are recovered therefrom by standard techniques such as freeze drying or extraction with a suitable water immiscible solvent followed by removal of the solvent.

The acid forms of the novel antibiotics of the present invention are, in turn, easily converted to salts by reaction with a suitable base. Thus, treatment of the desired antibiotic in aqueous solution with ammonium hydroxide produces the ammonium salt. In like manner other salts such as the calcium, magnesium, barium, potassium and sodium, are formed. In addition, amine salts, such as the procaine, dibenzylamine, N,N'-dibenzylethylenediamine, dehydroabietylamine, 1-ephenamine and N-benzyl-β-phenethylamine salts, are prepared by reacting a solution of the desired antibiotic in an aqueous or non-aqueous solvent with the desired amine. Alternatively, the amine salts are prepared in aqueous solution by reacting a metal salt of the desired antibiotic, e.g. the sodium salt, with the desired amine acid salt, for example, the amine hydrochloride salt.

The valuable nitrophenyl and nitroalkyl substituted antibiotics of this invention serve as useful intermediates for the production of the corresponding aminophenyl- and aminoalkylphosphoryl- and thionophosphoryl amidopenicillanic acids by catalytic hydrogenation.

In addition to the above described reaction of a monohalophosphate, or the corresponding sulfur analogs, with 6-aminopenicillanic acid, the reaction of a dihalophosphate of the formula $R_1YP(X)Cl_2$ or $R_1YP(X)Br_2$, wherein $R_1$, X and Y are as previously defined, with 6-aminopenicillanic acid in a molar ratio of about 1:1 produces secondary phosphate derivatives having an hydroxyl group in the phosphorus moiety: $R_1YP(X)(OH)$. The use of a ratio of 6-aminopenicillanic acid to dihalophosphate of or greater than about 2:1 replaces both halo atoms by a 6-aminopenicillanic acid moiety to give, when X and Y are oxygen, N,N'-bis-[(6-penicillanyl)amido] phosphate esters. The products are isotelic with the products of this invention.

This application is a continuation-in-part of copending application Serial No. 15,830, filed March 18, 1960, now abandoned.

The following examples are provided to further illustrate in detail methods for the procedure of the present invention. They are, however, not to be construed as limiting the invention in any way.

EXAMPLE I

To a well stirred solution of 6-aminopenicillanic acid (18 g.) in 200 ml. of water there is added solid sodium bicarbonate, sufficient to bring the pH to 7.5, and 400 ml. of acetone. A solution of diethylchlorothionophosphate (15 g.) in 25 ml. of acetone is then added dropwise during 15 minutes at 0°–5° C. after which the mixture is stirred at room temperature for four hours. The pH is maintained at 7.5 throughout the reaction by the addition of sodium hydroxide.

The reaction mixture is extracted twice with ethylacetate (300 ml.) to remove unreacted diethylchlorothionophosphate. The aqueous phase is then adjusted to pH 2.5 with dilute hydrochloric acid, and extracted twice with one-half volume of n-butanol containing 5% hexane (by volume). The n-butanolhexane extract is washed once with one-half volume of water and the water phase discarded. Water (175 ml.) is added to the n-butanol-hexane extract and the pH brought to 6.5 by the addition of 5 N potassium hydroxide. The aqueous phase is separated and the extraction with water (one-third volume) at pH 6.5 repeated. The combined aqueous extracts are washed with one-third volume of ether and freeze dried to give the potassium salt of 6-[(O,O-diethylthionophosphoryl)amido]penicillanic acid.

EXAMPLE II

Repetition of the procedure of Example I using 400 ml. of acetone-water (1–1) as solvent system for the 6-aminopenicillanic acid produces substantially the same results.

In like manner, the following [(thionophosphoryl)amido]penicillanic acid potassium salts are prepared from the appropriate chlorothionophosphate. For convenience only the R groups are listed since X is sulfur and Y is oxygen in all cases.

| $R_1=R_2$ | $R_1=R_2$ |
|---|---|
| methyl | n-butoxyethyl |
| isopropyl | β-methoxyheptyl |
| phenyl | n-propoxyamyl |
| n-butyl | methylmercaptoheptyl |
| β-methylpropyl | n-propylmercaptoamyl |
| n-propyl | β-phenoxy-n-hexyl |
| sec-butyl | w-phenoxy-n-butyl |
| trifluoroethyl | w-ethoxy-n-hexyl |
| β-nitrobutyl | β-nitroethyl |
| β-methoxyethyl | w-nitro-n-butyl |
| β-chloroethyl | w-nitro-n-hexyl |
| o-tolyl | w-nitro-n-heptyl |
| m-tolyl | w-chloro-n-heptyl |
| p-tolyl | β-bromopropyl |
| benzyl | m-nitrobenzyl |
| β-bromoethyl | o-nitrobenzyl |
| cyclohexyl | p-t-butylbenzyl |
| o-chlorophenyl | β-phenylethyl |
| p-chlorophenyl | w-phenylbutyl |
| o-bromophenyl | β-phenylbutyl |
| o-nitrophenyl | α-methoxyisobutyl |
| m-nitrophenyl | n-pentyl |
| p-nitrophenyl | n-hexyl |
| o-methoxyphenyl | n-heptyl |
| p-methoxyphenyl | γ-methylbutyl |
| o-ethoxyphenyl | ε-methylpentyl |
| p-propoxyphenyl | β-butoxypropyl |
| β-fluorophenyl | β-chloropropyl |
| α-methylbenzyl | β-methoxypropyl |
| m-ethylphenyl | allyl |
| p-t-butylphenyl | α-phenoxyethyl |
| p-butoxyphenyl | cyclopentyl |
| o-chlorobenzyl | α-phenylmercaptoethyl |
| p-chlorobenzyl | w-bromo-n-butyl |
| m-methoxybenzyl | w-chloro-n-hexyl |
| o-bromobenzyl | β-ethoxyethyl |
| p-nitrobenzyl | β-nitropropyl |
| m-methylbenzyl | α-nitromethylbutyl |
| p-n-butylbenzyl | α,γ-dimethylbutyl |
| o-propoxybenzyl | di-n-propylmethyl |
| o-propylphenyl | phenoxymethyl |
| p-isopropylphenyl | β-phenoxypropyl |
| α-phenoxyisobutyl | methylmercaptomethyl |
| ethylmercaptoethyl | phenylmercaptomethyl |
| butylmercaptomethyl | β-phenoxybutyl |
| β-phenylmercaptoethyl | β-nitrobutyl |
| β-phenylmercaptobutyl | |

EXAMPLE III

The procedure of Example I is repeated but using diethylbromothionophosphate in place of diethylchlorothionophosphate. Sodium hydroxide is used as neutralizing agent in the aqueous extraction of the product from the n-butanol-hexane extract to give the sodium salt of 6-[(O,O-diethylthionophosphoryl)amido]penicillanic acid.

EXAMPLE IV

Repetition of the procedure of Example I but substituting diethylchlorophosphate for diethylchlorothionophosphate gives the potassium salt of 6-[(O,O-diethylphosphoryl)amido]penicillanic acid.

In like manner, the following [phosphorylamido] derivatives of 6-aminopenicillanic acid are produced as their potassium salts from the appropriate chloro phosphate. $R_1$ and $R_2$ are alike in all compounds and X and Y are oxygen. For convenience only the R groups are listed.

| $R_1=R_2$ | $R_1=R_2$ |
|---|---|
| methyl | n-butoxyethyl |
| n-propyl | methoxyethyl |
| isopropyl | β-methoxypropyl |
| n-butyl | β-ethoxypropyl |
| isobutyl | w-ethoxy-n-hexyl |
| β-chloroethyl | 1,3-dichloro-isopropyl |
| β-bromoethyl | n-propoxyamyl |
| β-nitrobutyl | m-chlorophenyl |
| γ-chloropropyl | o-chlorophenyl |
| trifluoroethyl | β-fluoroethyl |
| sec-butyl | 3,5-diphenyl |
| o-tolyl | phenyl |
| m-tolyl | benzyl |
| p-tolyl | o-nitrophenyl |
| cyclohexyl | p-nitrophenyl |
| o-methoxyphenyl | p-methoxyphenyl |
| p-propoxyphenyl | α-methylbenzyl |
| p-t-butylphenyl | p-butoxyphenyl |
| o-chlorobenzyl | p-chlorobenzyl |
| o-bromobenzyl | p-nitrobenzyl |
| o-propylphenyl | p-isopropylphenyl |
| ethylmercaptoethyl | butylmercaptomethyl |
| β-phenylmercaptoethyl | n-butoxyethyl |
| β-methoxyheptyl | methylmercaptoheptyl |
| w-phenoxy-n-butyl | β-nitroethyl |
| w-nitro-n-hexyl | β-bromopropyl |
| p-t-butylbenzyl | β-phenylethyl |
| n-pentyl | n-heptyl |
| ε-methylpentyl | β-chloropropyl |
| β-methoxypropyl | allyl |
| cyclopentyl | w-chloro-n-hexyl |
| β-nitropropyl | β-nitrobutyl |
| di-n-propylmethyl | phenoxymethyl |
| phenylmercaptomethyl | β-phenoxybutyl |
| β-fluoroethyl | α-phenylmercaptoethyl |
| β-butoxypropyl | α-phenoxyisobutyl |
| α-phenoxyethyl | α-methoxyisobutyl |

EXAMPLE V

Freeze-dried cells of Nocardia F.D. 46973 (2 g./l.) [grown in 500 ml. of a medium containing 4 g./l. yeast extract, 10 g./l. malt extract and 4 g./l. glucose at 28° C. on a rotary shaker for 48 hours] and sodium benzylpenicillinate (5 g./l.) are shaken together in 0.05 M potassium phosphate buffer at pH 7.5 and 28° C. for 16 hours in the presence of 0.2% toluene.

The broth is filtered, adjusted to pH 2.7 with concentrated phosphoric acid and extracted with an equal volume of methylethylketone to remove unconverted benzylpenicillin. The 6-aminopenicillanic acid is determined by treating a filtered sample with penicillinase (Baltimore Biological Laboratory) and assaying the amount of penicic acid formed by quantitative paper chromatography using ninhydrin as color reagent. The reaction mixture was thus found to contain 2.4 g./l. of 6-aminopenicillanic acid.

One liter of the 6-aminopenicillanic acid containing broth (2.4 g./l.) is adjusted to pH 5.5 and reacted at 27°–30° C. with 3 successive stoichiometric quantities of diethylthionochlorophosphate. Each stoichiometric quantity of halide reactant is added all at once as a solution in 25 ml. of acetone, followed at half-hour intervals, by the succeeding quantities of halide. The pH is maintained at 5.5 by the addition of 50% sodium hydroxide solution. The product is isolated according to the procedure of Example I.

Repetition of this procedure at pH values of 3.5±0.1 and 8.5±0.1 also produces 6-[(O,O-diethylthionophosphoryl)amino]penicillanic acid potassium salt.

EXAMPLE VI

Following the procedure of Example I, the products listed below are prepared from the proper halophosphate.

mole of N,N'dibenzylethylenediamine in 10 ml. of isopropanol and the mixture thoroughly stirred. After 4 hours, the products is recovered by filtration, washed with ether and dried.

In like manner, the following amine salts of the products of Example V are prepared:

Dehydroabietylamine
Procaine
Dibenzylamine
l-Ephenamine
N-benzyl-β-phenethylamine

EXAMPLE X

To 0.001 mole of each of the products of Examples II through VI in 10 ml. of water there is added 0.001 mole of procaine hydrochloride in 20 ml. of water. The product precipitates and is recovered by filtration, washed with cold water and dried.

EXAMPLE XI

*Resistance to penicillinase.*—6-[(O,O - diethylthionophosphoryl)amido]penicillanic acid is tested for penicillinase resistance essentially according to the basic technique of Gots, Science 102, 309 (1945), which comprises incorporating a sensitive *S. aureus* strain into a brain-heart medium with the antibiotic to be tested. Upon incubation under standard conditions no growth occurs.

The process is repeated, this time placing penicillinase on the surface of the medium and the medium incubated as before. In the case of a penicillinase resistant antibiotic no zone of growth occurs whereas if the antibiotic is sensitive to penicillinase, a zone of growth occurs. By using known amounts of the antibiotic to the tested and known amounts of penicillinase, the resistance of the antibiotic to penicillinase, relative to that of benzylpenicillin

| R₁ | R₂ | X | Y | R₁ | R₂ | X | Y |
|---|---|---|---|---|---|---|---|
| Ethyl | Ethyl | O | S | Ethyl | o-Nitrophenyl | S | O |
| Isopropyl | Isopropyl | O | S | Do | β-Bromoethyl | O | O |
| n-Butyl | n-Butyl | O | S | Do | β-Ethoxyethyl | O | O |
| Cyclohexyl | Cyclohexyl | O | S | β-Methoxyethyl | Phenyl | O | O |
| Phenyl | Phenyl | O | S | Ethyl | n-Butyl | S | O |
| Benzyl | Benzyl | O | S | n-Butyl | Benzyl | O | O |
| Ethyl | Phenyl | O | O | Ethyl | Allyl | O | O |
| n-Butyl | do | O | O | 3-pentyl | 3-pentyl | O | O |
| Do | o-Chlorophenyl | O | O | n-Butyl | o-Nitrophenyl | O | O |
| Methyl | Phenyl | O | O | β-Chloroethyl | β-Chloroethyl | O | S |
| Ethyl | Cyclohexyl | O | O | β-Nitroethyl | Phenyl | O | S |
| Do | n-Butyl | O | O | Ethyl | n-Butyl | O | S |
| Isopropyl | Phenyl | O | O | n-Butyl | do | O | S |
| Ethyl | do | S | O | Phenyl | Phenyl | S | S |
| Phenyl | o-Chlorophenyl | O | O | Benzyl | Benzyl | S | S |
| β-Chloroethyl | Phenyl | S | O | β-Chloroethyl | β-Chloroethyl | S | S |
| Do | do | O | O | o-Tolyl | o-Tolyl | S | S |
| Ethyl | Ethyl | S | S | o-Chlorophenyl | o-Chlorophenyl | S | S |
| β-Phenylethyl | β-Phenylethyl | S | S | o-Methoxyphenyl | o-Methoxyphenyl | S | S |
| Heptyl | Phenyl | S | O | Allyl | Allyl | S | S |
| Ethyl | o-Methoxyphenyl | S | O | (R₁+R₂) | Phenyl | O | O |
| Do | β-Chloroethyl | S | O | (R₁+R₂) | do | S | O |

EXAMPLE VII

The products of the preceding examples are converted to their free acid form by acidification of an aqueous solution of the potassium salts to pH 2.5 with hydrochloric acid. The acids are extracted from aqueous solution with ether, the ether solution dried and the acids recovered by evaporation.

EXAMPLE VIII

The sodium, calcium and ammonium salts of the products of Example VI are prepared by neutralizing a suspension of the appropriate acid (0.001) mole) in 20 ml. of water with an equimolar quantity of sodium, calcium or ammonium hydroxide. The salts are isolated by freeze drying.

EXAMPLE IX

To 0.001 mole of each of the products of Example VI in 10 ml. of methylisobutylketone there is added 0.001 as standard, is determined. In this manner, a value, "K," defined as $$K = \frac{\text{zone size against benzylpenicillin}}{\text{zone size against experimental penicillin}}$$

is obtained. Values of K equal to or greater than 1 indicate resistance to penicillinase. When the denominator is zero, that is, when no zone of growth occurs, K≫1 and the experimental antibiotic is completely resistant to penicillinase.

6-[(O,O - diethylthionophosphoryl)amido]penicillanic acid is thus found to be completely resistant to penicillinase.

Similarly the remaining products of the preceding examples are found to possess resistance to penicillinase to a varying degree in having K values greater than 1.

What is claimed is:
1. A compound selected from the group consisting of compounds having the formula:

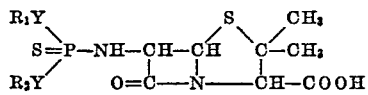

and non-toxic salts thereof wherein each of $R_1$ and $R_2$ is selected from the group consisting of straight-chain and branched-chain alkyl groups containing 1 to 7 carbon atoms, substituted alkyl wherein the substituent is selected from the group consisting of lower alkoxy and chloro, phenyl, substituted phenyl wherein the substituent is selected from the group consisting of chloro and lower alkyl, and $R_1$ and $R_2$ when taken together are phenyl; and Y is selected from the group consisting of oxygen and sulfur.

2. The potassium salt of 6-[(O,O-diethylthionophosphoryl)amido]penicillanic acid.

3. The sodium salt of 6-[(O,O-dimethylthionophosphoryl)amido]penicillanic acid.

4. The calcium salt of 6-[(O,O-diethylthionophosphoryl)amido]penicillanic acid.

5. 6 - [(O,O - diethylthionophosphoryl)amido]penicillanic acid.

References Cited in the file of this patent
UNITED STATES PATENTS
2,941,995    Doyle et al. _____ June 21, 1960
FOREIGN PATENTS
569,728     Belgium _____ Nov. 15, 1958
OTHER REFERENCES
Morton: The Chemistry of Heterocyclic Compounds, page VI of the preface (1946), Call No. QD 400 M65.